Nov. 14, 1950     H. F. HOBBS     2,530,200
TRANSMISSION

Filed Sept. 29, 1947     5 Sheets-Sheet 1

INVENTOR
HOWARD F. HOBBS
By Young, Romney & Thompson
Attys.

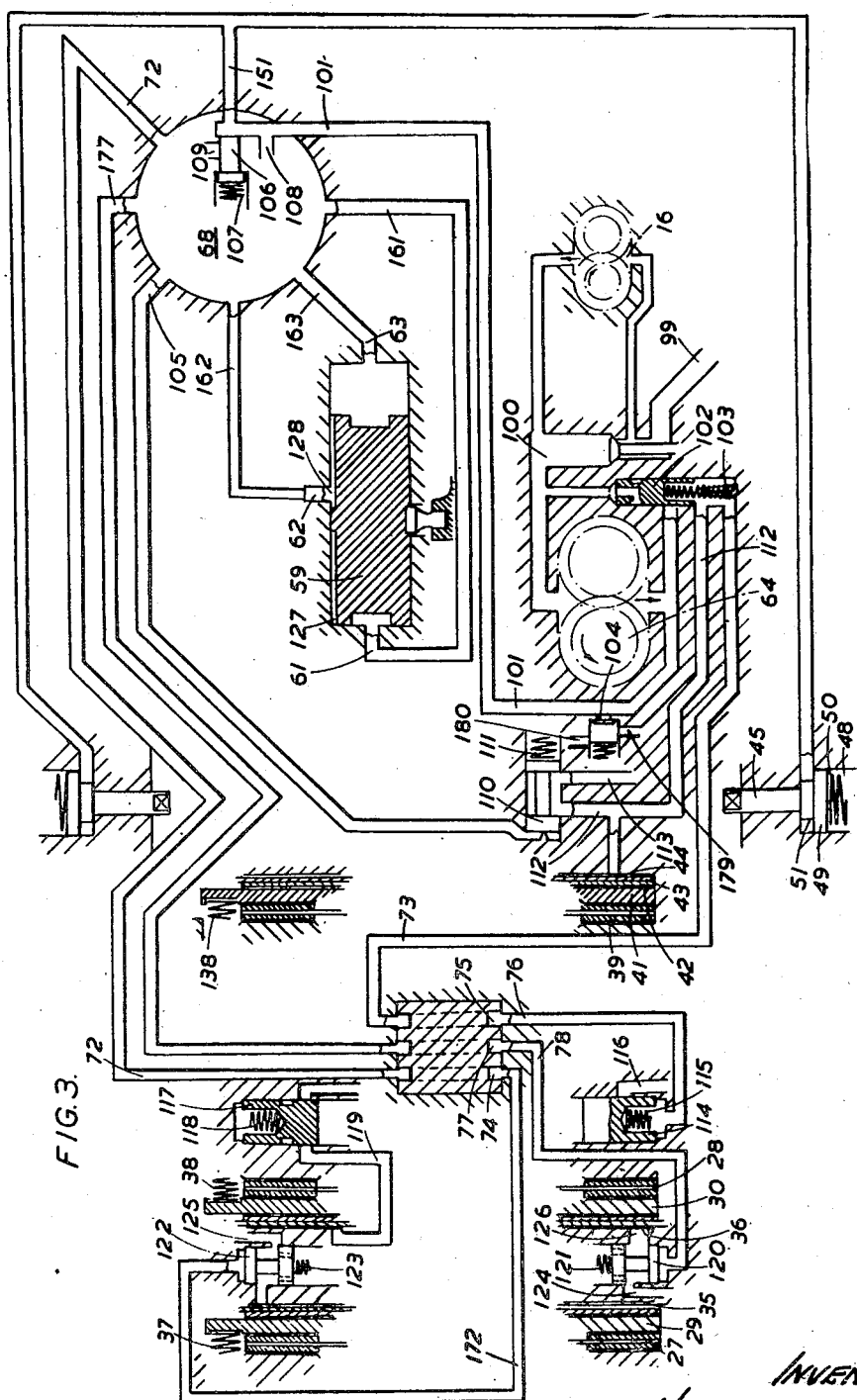

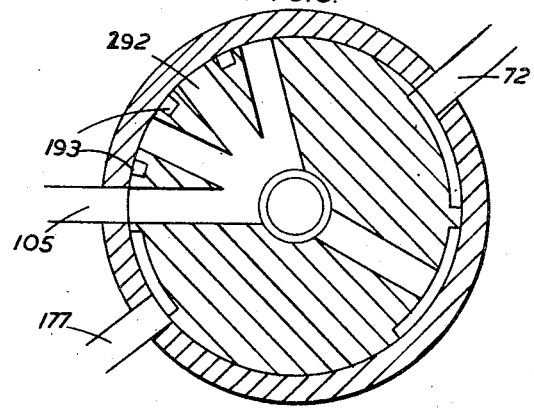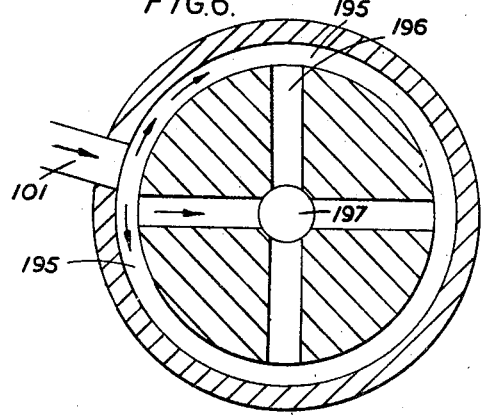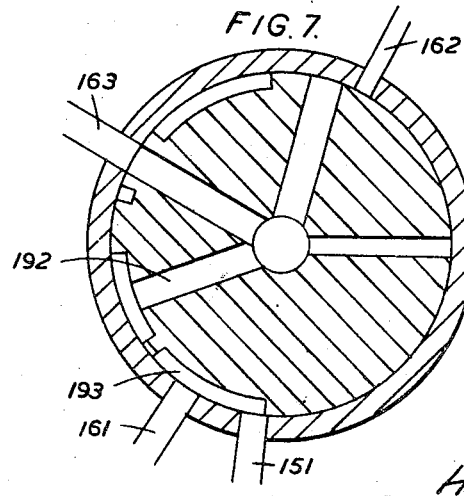

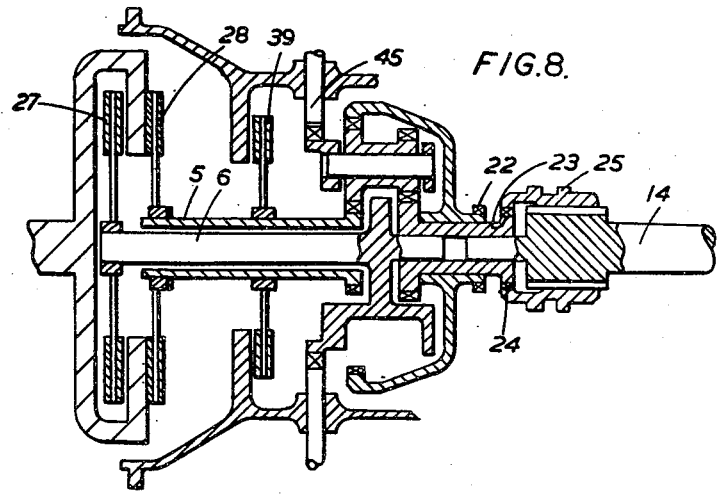
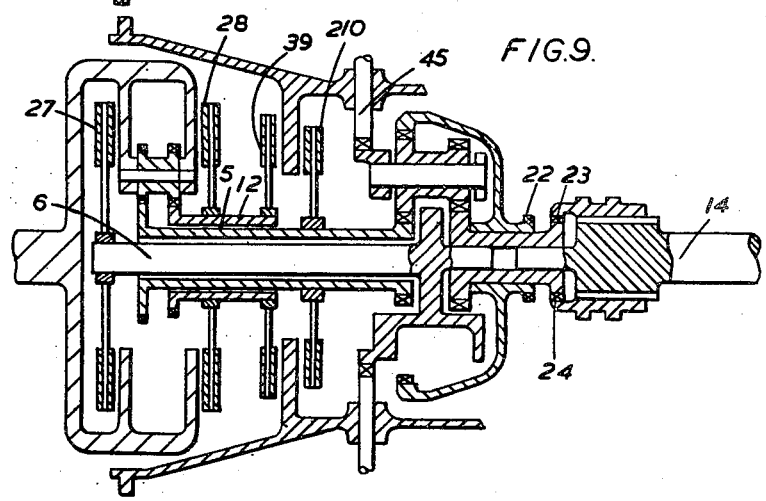
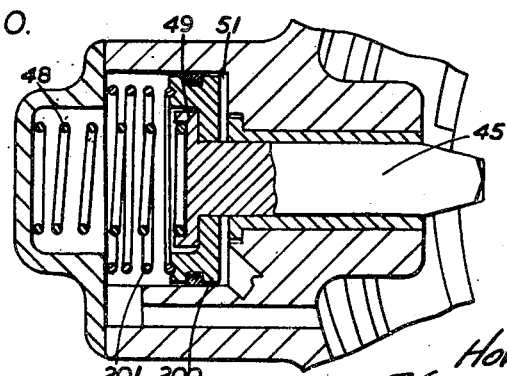

Patented Nov. 14, 1950

2,530,200

UNITED STATES PATENT OFFICE 2,530,200

TRANSMISSION

Howard Frederick Hobbs, Leamington Spa, England, assignor to Hobbs Transmission Limited, Leamington Spa, England, a British company Application September 29, 1947, Serial No. 776,703
In Great Britain October 21, 1946

16 Claims. (Cl. 74—754)

This invention relates to variable-ratio power transmission apparatus of the kind comprising gearing of the type in which one or more of the elements of the gearing are required to be driven and one or more reaction elements are to be braked in order to make the gear trains of said gearing operative.

According to the invention the apparatus comprises an input shaft, two intermediate shafts, an output shaft, gearing connecting the input shaft with at least one of said intermediate shafts whereby said intermediate shaft can be driven at a speed different from that of the input member, further gearing adapted to engage said intermediate shafts operatively with the output shaft, two clutches whereby the input shaft can drive each intermediate shaft separately and simultaneously, whereby the output shaft will be driven in one transmission ratio by engagement of the one clutch and in another transmission ratio by engagement of the other clutch and in still another transmission ratio by engagement of both clutches simultaneously, and at least one detent adapted to hold one of the intermediate shafts stationary during drive in at least one transmission ratio, and at least one brake whereby a reaction element providing reaction for one of the said gearings can be held stationary, thereby producing a series of torque speed transmission ratios.

The simultaneous engagement of the clutches enables the torque to be shared in providing at least one of the driving ratios.

One element of the gearing associated with the input shaft may be attached to the input shaft thereby transmitting part of the torque directly to said gearing whereby the torque carried by one or both of said clutches is reduced.

The said gearings may have double planetary pinions (i. e., pinions of different sizes fixed together) and the clutches engaging the intermediate shafts with the input shaft may be lubricated plate clutches hydraulically actuated. fluid pressure being led to a diaphragm of flexible material which acts through an insulator plate upon a pressure plate. The brakes which hold the reaction elements stationary may be of similar construction and the amount of torque to be carried by these clutches and brakes may be about equal to input torque or may be considerably less. The inner intermediate shaft may carry the cage of a planetary gear train constituting the gearing associated with the output shaft and when this cage is held stationary so as to serve as a reaction element the reaction torque may be considerably in excess of input torque and the member may be held by teeth engageable by pawls mounted on a stationary part. The pawls may be hydraulically engaged and/or disengaged, and a baulk or blocker ring may be provided to assist in shockless engagement of the pawls. The pawls may be pressed into engagement by a spring and may be disengaged by means of hydraulic pressure.

Alternatively the reaction element may carry part of a free-wheel detent as well as part of a hydraulically applied plate brake whereby part of the reaction torque is carried by the free-wheel and part by the brake.

According to an important subsidiary feature of the invention, the gearing associated with the output shaft may comprise two sun-wheels, a set of double planetary pinions carried in a cage, and an internally toothed ring gear meshing with the one set of the double pinions which also mesh one of the sun-wheels. One of the sun-wheels and the ring gear will serve as output members and the output shaft will carry a slidable dog clutch which is engageable with one or the other of said members.

According to a further feature of the invention the teeth of the dog clutch are formed with a small helix angle so that driving torque during operation in one or more ratios will exert a thrust in a direction tending to hold the teeth engaged whereas over-run torque will tend to disengage the teeth or vice versa, the angle being so small, however, that the friction on the clutch teeth and spline on which the clutch member is mounted is sufficient to counteract the aforesaid thrust, the arrangement being such that if disengaging pressure is applied to the movable clutch member in the same direction as the thrust the teeth will be disengaged even when under load. For direct drive the movable clutch member may be engaged with either of the said members. The selection of the required ratio will bring about unloading of the dog clutch and/or thrust in the direction to assist disengagement.

The apparatus may be constructed so that both the said output members carry teeth engageable with the mating teeth of the dog clutch member, all three sets of teeth having the above mentioned small helix angle formation. Alternatively, these teeth may be straight and the splines carried by the output shaft on which the dog clutch member is mounted may be of the small helix angle formation.

An important aspect of the invention is the combination of the said clutches, brakes, gearings and dog clutch whereby when it is desired to move the dog clutch for disengagement under load the thrust from the teeth of the dog clutch will act in the required direction to assist movement.

In order that the invention may be clearly understood a constructional form thereof will now be described by way of example with reference to the accompanying diagrammatic drawings, wherein:

Figure 3 shows the arrangement of the hydraulic circuit;

Figure 2:
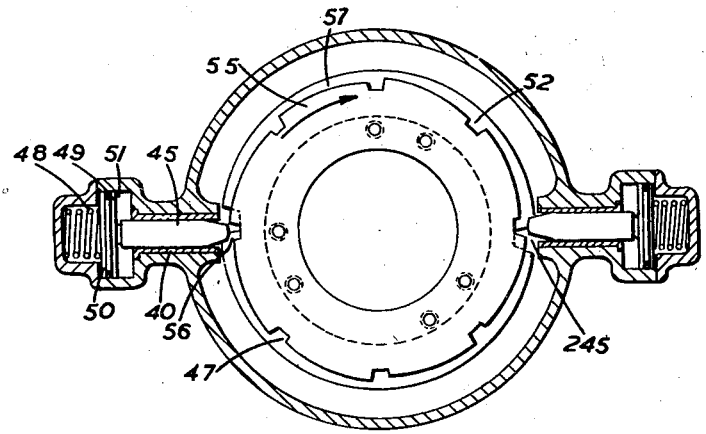
Figure 2 is a transverse sectional view of a part of the structure of Figure 1 showing the arrangement of the detent and baulk ring mechanism.
Figure 4:
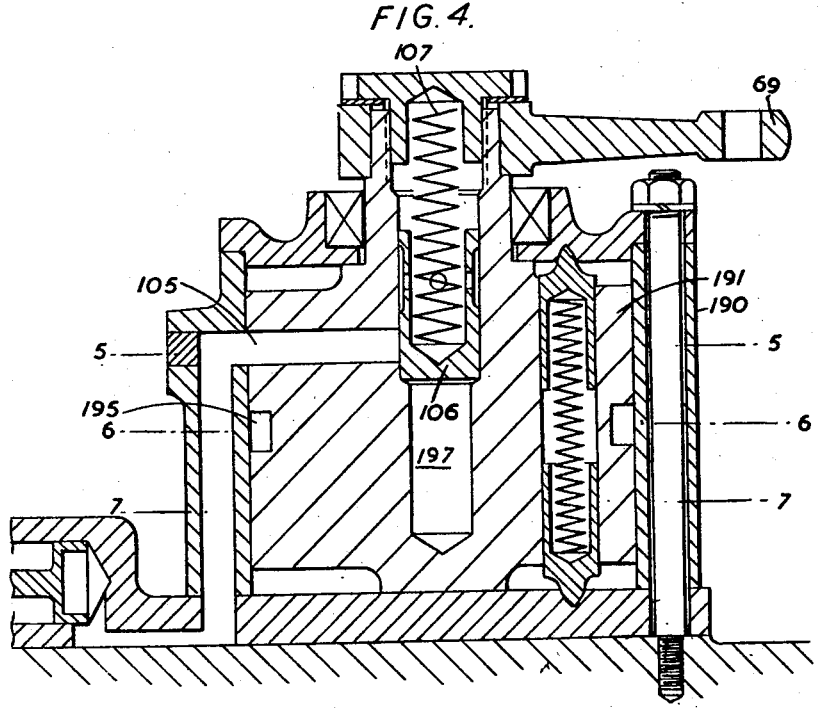
Figure 4 is a view in axial section of a rotary valve suitable for use in the apparatus shown in Figures 1 to 3.

Figures 5, 6 and 7 are sectional views on the lines 5—5, 6—6, 7—7, respectively, on Figure 4; and Figures 8 and 9 are sectional views of two modified forms of apparatus made in accordance with the invention; and Figure 10 is a sectional view similar to part of Figure 2 but showing a modified construction.

The apparatus has an input member in the form of a flywheel 1, two intermediate shafts 5, 6 and an output shaft 14. The flywheel 1 is mounted on the engine crankshaft or input shaft by bolts (not shown) and carries parts 2, 2a, 3, and 4, which form a rotary housing for the clutches and the gearing associated with the input shaft. The intermediate shafts 5, 6 are arranged concentrically one within the other and are disposed within the housing. A set of double planetary pinions 7 are mounted on spindles 8 carried in side plates 9 bolted to the part 3 of the rotary housing. The double pinions 7 mesh with the sun-wheels 10, 11, the sun-wheel 10 being formed on the front end of the intermediate shaft 5, and the sun-wheel 11 on a reaction sleeve 12. The rear end of the intermediate shaft 6 carries a flange 13 which forms part of the cage, and is hereinafter referred to as the cage, for the gearing associated with the output shaft 14. This gearing comprises double planetary pinions 15, the ring gear 16, and the sun-wheels 17, 18, the pinions 15 being mounted on pins 19 carried in plates 20, 21 which are bolted to the cage 13. The ring gear 16 carries the teeth 22 of small helix angle formation and the sun-wheel 18 is mounted on a sleeve carrying teeth 23 of similar helical shape which mesh with the internal teeth 24 of a dog clutch 25 axially slidable on splines 26 carried by the output shaft 14. The sun-wheel 17 is mounted upon splines formed on the intermediate shaft 5.

A clutch plate 27 is carried by the forward end of the intermediate shaft 6 and a clutch plate 28 is carried by the reaction sleeve 12. Both clutch plates are engageable with the input rotary housing for which purpose pressure plates 29, 30 are moveable into engagement with the clutch plates 27, 28 by means of fluid pressure which is introduced into spaces 35, 36 and acts on the presure plates through flexible diaphragms 33, 34 and insulator plates 31, 32. Springs 37, 38 tend to hold the clutches disengaged. Plate 39 is part of a plate brake for holding the reaction member 12 stationary.

A plate 40 is fixed in the gear housing 140 and a reaction friction plate 39 is engageable with the stationary gear housing by means of plate 40 and pressure plate 41. Pressure is led to the space 44 and acts through diaphragm 43 and insulator plate 42. The springs 138 serve to urge the pressure plate 41 in the disengaging direction.

Figure 1:
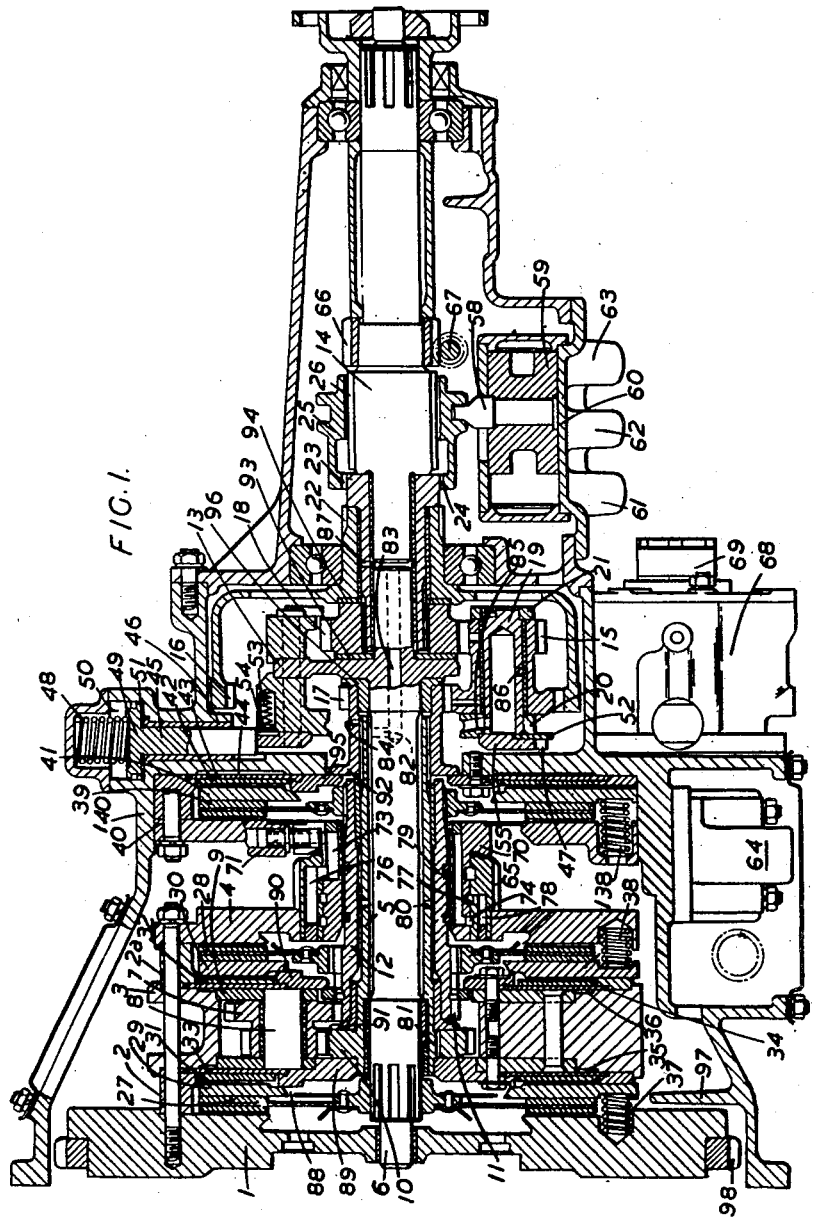
Figure 1 is an elevational view partly in section of an apparatus made in accordance with the invention.

Pawls 45 operate in sleeves 46 and can engage teeth 47 carried by a plate 55 which in turn is carried by the cage 13. The springs 48 serve to move the pawls into engagement and the piston 49 operating in cylinder 50 serves to move the pawls out of engagement, fluid pressure being fed to a space 51. A baulk or blocker ring 52 has steps 56 which can lodge beneath the pawls 45 and thus prevent engagement with the teeth 47 until such time as the teeth become stationary and begin to rotate in a reverse direction. The pawls are always engaged in peripheral openings 245 in the ring 52 whereby the latter has only a limited degree of rotary motion. Springs 53 cause pads 54 to press on the blocker ring 52 which tends to cause the blocker ring 52 to rotate in frictional contact with the plate 55 carrying the teeth 47. When the pawls are held in the disengaged position and the plate 55 rotates in the direction of the arrow which is for forward running the ring 52 rotates until the steps 56 lodge under the pawls 45. If the plate 55 now comes to rest and begins to rotate in the opposite direction the plate 52 will also begin to rotate thereby moving the steps 56 from underneath the pawls allowing the springs 48 to move the pawls into engagement with the plate 55. If the pawls should not happen to be in alignment with the teeth 47 the plate 55 will rotate until the next pair of teeth align with the pawls when engagement will take place. Cam shaped surfaces 57 assist the engagement. If in any circumstances the pawls 45 should come into contact with the plate 55 when this is rotating in the forwards direction the cam shaped surfaces will prevent engagement of the pawls and damage to either pawls or teeth. With the pawls in the position shown in Figure 1 the pressure is exhausted from the space 51 and with the pawls in the position shown in Figure 2 the pressure is opened to the space 51.

The dog clutch member 25 is actuated by a striker fork 58 and piston 59 which operates in a cylinder 60. Three pressure ducts communicate with the cylinder, the ducts being formed in the bosses 61, 62, 63. If the duct in 61 is open to pressure and the duct in 63 is open to exhaust, the pressure will act on the left hand end of the piston and move it to the position shown. If the duct in boss 61 is open to exhaust and the duct in boss 63 is open to pressure, pressure will act on the right hand end of the piston 59 and move it to the left. If the duct in the boss 62 is open to pressure, pressure will enter the cylinder through one of two grooves in the piston 59 as shown in Fig. 3 and these are so positioned that should the piston be to the right the pressure will be led to the left hand end of the piston and should the piston be to the left the pressure will be led to the right hand end of the piston. The piston has only two operating positions, either fully to the right or fully to the left. By opening pressure to the duct in boss 62 it is held in whichever of these positions it happens to be. A pump 64 is driven from a skew gear 65 carried by the rotary clutch housing through a vertical shaft not shown which carries the mating skew gear. The pump 64 (Fig. 3) normally serves to provide pressure for operating the clutches, brake, detent and dog clutch. An additional pump 164 (Figure 3) is driven from the skew gears 66, 67 which also serve for speedometer drive. This pump 164 serves to provide pressure should the rotary housing be stationary, as for example when it is desired to start an engine by towing a vehicle. The fluid delivered by the pumps enters a rotary valve 68 which is operated by means of a lever 69 which may be connected by any convenient means to a control lever mounted under the steering wheel of the vehicle or in any other suitable position. The valve 68 directs the pressure to the various parts as and when required by suitable positioning of the lever 69, and connects the ducts in the bosses 61, 62, 63 and the spaces 51 by means of external pipes. A suitable drilling is provided connecting the valve to the space 44, and further bores are provided which connect with drillings in the plate 40. These drillings connect with a feed member 70 by means of tubes such as 71. The feed member has drillings such as 72 and 177 (Figure 3) and grooves 74, 77 which mate with grooves and drillings such as 78 in the rotary clutch housing. These drillings connect through further drillings to the spaces 35, 36 respectively so that pressure in 72 applies to clutch 27 only and pressure in 177 applies to clutch 28 only. Further grooves and drillings 73, 75, 76 are provided the purpose of which will be later explained. The pump 64 also provides oil under pressure for lubrication purposes and this is fed through drillings to a tube such as 71 and from this tube through further drillings into the space 79 whence it reaches the various rubbing surfaces through holes such as 80, 81, 82, 83, 84, 85, 86, 87 and oil grooves provided. Some of the oil supplied for lubrication reaches the spaces surrounding the plates of the clutches and brake. Most of this is normally diverted away from the friction surfaces and when the clutches are engaged some of it enters at the position shown at 88 and passes outwards between the pressure plates and the insulator plates through grooves provided for the purpose. When the clutches are disengaged the pressure plates abut against the plates 89, 90 and therefore tend to divert the oil to the friction faces. The steel plates of the clutch plates 27, 28 and brake 39 are provided with holes so that some of the oil entering one side of the clutch may pass to the other.

The teeth of the gearing are of helical formation and the angles of the teeth may be such as to cause the thrusts on the pinions to be self-contained and balanced. The sun-wheels of the gearing thrust against surfaces such as those of the plates 89, 90 and of the bush 91, and those of the plates 92, 93, 94, 95 and of the bush 96.

The weir 97 serves to retain an oil level above the pump 64 and gutters are provided to assist the flywheel in removing any oil which enters the front side of the weir. The weir also serves to trap any chips which may be removed from the teeth of the starter ring 98.

The hydraulic circuit of the apparatus is arranged as shown in Figure 3. The pump 64 draws oil from the suction pipe 99. The pump 164 driven from the skew gears 66, 67, Figure 1, draws also from the suction pipe 99 and normally delivers to the ducts 100 which form the suction side of pump 64. The pump 64 delivers to duct 101 which leads to the rotary valve 68. Should the delivery of the pump 64 become less than the delivery of the pump 164, for example when the input shaft becomes stationary, pressure will be built up in the ducts 100, causing a valve 102 to move against its spring 103 thus opening the delivery of pump 164 to duct 101.

It will be observed that during all normal running, the delivery of the pump 64 will be in excess of the delivery of the pump 164, consequently pump 164 will deliver no pressure but merely a quantity of oil to the suction space 100. The duct 101 is provided with a relief valve 104. This valve 104 therefore serves to relieve pressure from either pump. The relief valve 104 opens to duct 179 leading to space 79 thus maintaining pressure for lubricating the various parts before opening to the exhaust 180.

Ducts 161, 162, 163, 151, 72, 177, 105 lead into the body of the valve 68. Duct 161 leads to one end of the piston 59, duct 163 communicates with the other end of the piston, duct 162 leads to an opening 62 at about the middle of the cylinder containing the piston 59 and communicates with one or other end of the piston through ducts 127, 128, in the piston; duct 151 leads to the spaces 51 which control the operation of the pawls 45. The ducts 72, 177, lead to ducts 74, 77; then to 172 and 78, which lead respectively to valve 122 and valve 120.

The oil pressure from the duct 101 is led to the rotary member of the valve and this carries two sets of ports, one set mating with the ducts 151, 161, 163, 162 and the other set mating with the ducts 72, 177 and 105. A valve 106 and valve spring 107 are carried in the rotary member and a duct 108 leads from the duct 101 to the set of ports mating with ducts 151, 161, 163, 162 and a duct 109 leads from the bore of the valve 106 to the set of ports engaging the ducts 72, 177, 105. As will be described, under certain circumstances the pressure in the ducts 105, 177 and 72 and the purpose of the valve 106 is to prevent corresponding reduction of pressure in the ducts 151, 161, 163, 162, and if desired to maintain a greater pressure in these ducts than will be maintained in the other ducts.

The duct 105 leads to a valve 110 controlled by a spring 111. Pressure in duct 105 will move the valve 110 to the right and thus open the duct 105 to a duct 112 which leads to the space 44 of the brake 39. When pressure is removed from the duct 105 the valve 110 will move to the left thereby opening the duct 112 of the space 44 to the exhaust duct 113. The duct 112 also joins the duct 73 which leads to the groove 75 and the drilling 76 in the rotary clutch housing.

A centrifugally operated valve 114 operates in a radial bore formed in the clutch housing and a spring 115 serves to move the valve 114 inwards at low or idling speeds of the input shaft whereby the duct 76 is open to the exhaust 116. This reduces the pressure in the ducts 73, 112 and space 44 and allows the springs 138 to disengage the brake 39. Increased speed will cause the valve 114 to move outwardly thereby closing port 116 and causing increase of pressure and engagement of the brake 39.

A valve 117 and spring 118 associated with the oil space 36 of the clutch 28 operates in a similar manner. A duct 119 leading from the space 36 to the valve 117 connects the space near its inner diameter. The valve 117 will relieve the pressure from the space 36 but will maintain the space filled with oil so that the clutch will engage without delay on increase in speed of the input shaft and rotary housing of the clutch.

Each of the spaces 35, 36 associated with the clutch plates 27, 28 are controlled by a valve similar in function to valve 110, valve 120 and spring 121 being associated with space 36 and valve 122 and spring 123 being associated with the space 35. These valves open the spaces to the exhausts 124, 125. The mass of the valves is made such to exert a centrifugal force equal to the centrifugal pressure in the oil acting on the outer ends of the valves. If the pressure from the pump is open to duct 78 the total pressure acting on the end of the valve 120 will be sufficient to overcome the spring 121 and the valve will move inwards thereby opening the duct 78 to the duct 126, and the space 36. If the pressure is removed from the duct 78 by operation of the valve 68 the centrifugal pressure of the oil acting on the outer end of the valve is alone insufficient to hold the valve 120 inwards and the valve will move outwards thereby opening the duct 126 and space 36 to the exhaust 124. The operation of the valve 122 is similar.

As above described under some circumstances the pressure from pump 164 will move the valve 102 thereby allowing pressure from pump 164 to enter the rotary valve 68. Movement of the valve 102 will also cause the duct 112 to be disengaged from the duct 73 and valve 114. If the input shaft is stationary there will be no centrifugal force on the valve 114 and it will be located in its innermost position and exhaust 116 will be opened to duct 76. If the pressure from the pump 164 is therefore opened by valve 68 to duct 105, such as for starting an engine by towing the vehicle, the pressure will escape to the exhaust 116. The movement of the valve 102 prevents this by closing the duct 112. As will be described later the clutch 27 is not engaged alone but together with either the clutch 28 or the brake 39. It is unnecessary, therefore, to provide a centrifgually operated valve such as 114, 117 to control the oil space 35. The automatic coupling and uncoupling of the input shaft to the transmission apparatus at low speeds will take place however in each ratio provided by the apparatus owing to the automatic engagement and disengagement of brake 39 and clutch 28.

The apparatus provides five forward torque speed ratios and one or two reverse ratios as required.

The operation is as follows:

The lever 69 attached to the rotary part of the valve 68 may be moved to eight different positions.

*1st position.*—This will provide the highest ratio in reverse drive. When the rotary element of the valve 68 is in this position the pressure from the duct 101 will be directed to duct 163 thereby holding the piston 59 and the dog clutch 25 to the left in which position it engages the teeth 22 and thereby connects the ring gear 16 to the output shaft 14. The duct 151 will mate with a port leading to exhaust and spaces 51 are therefore connected with exhaust so that the pawls 45 will be engaged with the teeth 47 thereby holding the cage 13 stationary. The duct 105 will be open to pressure and the plate brake 39 will be held stationary. The reaction sleeve 12 which carries the brake will be held stationary and the double pinions 7 will be carried around by the rotary housing of the clutch thus causing the sun-wheel 10 and intermediate shaft 5 to rotate in a forwards direction at a reduced speed. The intermediate shaft 5 carries sun-wheel 17 rotation of which rotates the planetary pinions 15 on their spindles 19 causing ring gear 16 and the output shaft 14 to rotate in a reverse direction. As described above in all ratios, the input shaft will be automatically uncoupled at and below some predetermined low speed. The operator may therefore cause the apparatus to be coupled to the engine and the vehicle started merely by opening an engine throttle, similarly he may allow a vehicle to come to rest by closing the throttle. The ducts 72, 177, 161 are in this ratio connected to exhaust and 162 is closed at the valve end against both pressure and exhaust.

*2nd position.*—This will provide the lowest ratio in reverse drive. When the rotary element of the valve 68 is in the second position the pressure will be opened to the duct 177, (so as to engage the clutch 28) and closed to the duct 105 thereby releasing the brake 39. Pressure will remain open to duct 163 and duct 151 will remain open to exhaust. Ducts 72, 161 are still open to exhast and 162 is still closed. Pressure from the duct 177 reaches the space 36 and causes the clutch plate 28 to be engaged with the clutch rotary housing. This causes the sun-wheel 10 and the intermediate shaft 5 to be rotated with the rotary housing, the planetary pinions 7 ceasing to rotate upon their spindles 8. The sun-wheel 17 is driven by the intemediate shaft 5 and this rotates the planetary pinions 15 on their spindles 19 causing the ring gear 16 and the output shaft 14 to rotate in a reverse direction at a higher speed. It will be observed that when operating in this condition the spindles 8 impart torque to the sun-wheel 10 and intermediate shaft 5, and the clutch 28 therefore transmits only the remainder of the torque and not the whole of the input torque. The ratio transmitted by the front gearing will be about 2:1 when the reaction sleeve 12 is held stationary (as when operating in the 1st position) and reaction torque on the sleeve 12 in this case will be equal to input torque, and the torque on the sun-wheel 10 will be twice input torque, hence when the clutch plate 28 is engaged for operation in 2nd position it will carry only half of the input torque which is transmitted by the sun-wheel 10.

*3rd position.*—When in this position the apparatus will be in neutral. The rotary element of valve 68 will open pressure to duct 161 and will open duct 163 to exhaust thereby causing the piston 59 and dog clutch 25 to move to the right. Teeth 23 will be engaged by teeth 24 and the sun-wheel 18 will thus be connected with the output shaft 14. The remainder of the ducts in the valve body, excepting duct 162, will be opened to exhaust by the rotary element. The clutches 27, 28 and brake 39 will remain disengaged. Duct 162 is still closed.

*4th position.*—This provides 1st ratio forward drive. When in this position the rotary element of valve 68 will cause the duct 161 to remain open to pressure and the duct 163 open to exhaust. The duct 151 will remain open to exhaust so that the cage 13 remains fixed. Pressure will be opened to duct 105, ducts 177 and 72 being open to exhaust. Duct 162 is still closed. Pressure will enter the space 44 thereby engaging the plate 39 with the stationary housing. The clutches 27, 28, are disengaged. The reaction sleeve 12 will be held stationary and the sun-wheel 10 and intermediate shaft 5 will be driven at a reduced speed by the planetating pinions 7. The sun-wheel 17 will be rotated by the shaft 5 thus rotating the planetary pinions 15 on their spindles 19 thus driving the sun-wheel 18 and the output shaft 14 in a forwards direction at a reduced speed. As mentioned above, the ratio provided by the gearing associated with the input shaft may be approximately 2:1. The ratio provided by the gearing 17, 15, 18 may also be about 2:1. It will be clear therefore that when operating in 1st ratio the total gear ratio will be about 4:1 and the torque carried by the reaction brake plate 39 will be approximately equal to the input torque. The remainder of the reaction torque is carried by the pawls 45. This same condition holds for highest ratio reverse drive. In this case the ratio will be greater owing to driving the ring gear 16 instead of the sun-wheel 18.

*5th position.*—This provides 2nd ratio forward drive. When in this position the rotary element of valve 68 will continue to direct pressure to duct 161 and to open ducts 163, 151 to exhaust. Duct 105 will be open to exhaust thereby exhausting space 44 and disengaging plate 39. Duct 177 will be open to pressure thereby leading pressure to space 36 and engaging clutch plate 28. Duct 72 is open to exhaust and 162 is still closed. As in the case of lowest ratio reverse the intermediate shaft 5 will now be carried around at the same speed as the clutch housing. The driving ratio will be provided by sun-wheel 17, planetary pinions 15 which rotate now only on their spindles 19 and sun-wheel 18 which connects the output shaft 14. This ratio may be about 2:1 and the plate 28 will carry about half input torque. The whole of the reaction is carried by the pawls 45. It will be observed that the pawls 45 remain in engagement in the positions so far described. The torque reaction is proportionately high in these ratios and it would be difficult to carry with a plate brake if it were not of much greater dimensions than the others employed in the apparatus. If the apparatus is used for a vehicle transmission the driver may inadvertently or by reason of inexperience move the control to the positions giving either 1st or 2nd gear forward or reverse drive, while the vehicle is travelling at relatively high speed. The use of the pawls with the baulk or blocker ring 52 prevents any damage or undesirably high torque loading which may arise in such circumstances, for the pawls will not engage until such time as the cage is relatively stationary.

*6th position.*—This provides 3rd ratio forward drive. When in this position the rotary element of valve 68 will continue to direct pressure to duct 161 and open duct 163 to exhaust. Duct 151 is open to pressure. This pressure reaches the spaces 51 and acts on pistons 49, causing the pawls 45 to move out of engagement with the teeth 47. Pressure is open to ducts 105, 72 which causes both the plate brake 39 and the clutch plate 27 to be engaged. Duct 177 is open to exhaust whereby clutch 28 is disengaged. Duct 162 still closed. Engagement of plate 27 causes the intermediate shaft 6, the cage 13 and the spindles 19 to be carried around at the same speed as the input shaft and clutch housing. Engagement of the plate 39 causes the intermediate shaft 5 to rotate at a reduced speed. The pinions 15 planetate about the sun wheel 17 which rotates more slowly than the cage 13 and rotate the sun-wheel 18 and output shaft 14. The ratio provided may be about 1⅓:1 or somewhat greater. It will be observed that during this condition of running the torque is shared between the intermediate shafts 5, 6. The reaction plate 39 carries the whole of the reaction torque which will be about ⅓ of the input torque. The shaft 5 will carry, therefore, about ⅔ input torque and the spindles 8 will transmit about ⅓ input torque, hence the clutch plate 27 will transmit the remainder which is about ⅔ input torque, the torque being divided between the plate 27 and the spindles 8.

*7th position.*—This provides 4th ratio forward (direct drive). When in this position the rotary element of valve 68 will direct pressure to ducts 162, 151. Pressure in 162 will reach groove 127 to the left hand end of the piston 59 thereby holding the piston to the right. If the piston 59 is to the left, pressure in duct 162 will reach groove 128 and be led to the righthand of the piston, thereby holding it to the left. Duct 72 will remain open to pressure and duct 105 will be open to exhaust and 177 open to pressure thereby disengaging plate 39 and engaging clutch plate 28, while clutch 27 remains engaged. Ducts 161 and 163 are closed. Both the intermediate shafts 5, 6 will rotate at the same speed as the input shaft and rotary housing. The intermediate shafts 5, 6 carry the sun-wheel 17 and the cage 13, hence these will rotate at the same speed which prevents pinions 15 rotating on their spindles 19 and hence carries sun-wheel 18 and output shaft 14 at the same speed. The ratio is 1:1. The torque transmitted from the input shaft will be shared between plates 27, 28 and spindles 8. The plate 27 will carry about half the engine torque, the plate 28 about quarter and the spindles 8 about quarter. All the gearing will rotate as a locked unit. The sleeve 12 and the shafts 5, 6 also rotating without relative movement.

*8th position.*—This will provide the 5th ratio forward (over-drive). When in this position the rotary element of valve 68 will direct pressure to duct 163 and open duct 161 to exhaust. This causes piston 59 and the dog clutch 25 to move to the left and teeth 22, 24 to engage. Ring gear 16 is coupled to the output shaft 14. The rotary valve 68 will continue to direct pressure to ducts 151 and 72. 177 will be open to exhaust and duct 105 opened to pressure. Duct 162 is closed at the valve. This causes the clutch plate 27 to remain engaged, the clutch plate 28 to be disengaged and the brake plate 39 to be engaged. The intermediate shaft 6 will continue to rotate at the same speed as the input shaft. The intermediate shaft 5 will be rotated at a reduced speed. The cage 13 will be carried around the sun-wheel 17, the pinions 15 rotating on their spindles 19, thus driving the ring gear 16 at an increased speed, thereby providing an overdrive ratio to the shaft 14. The ratio will be about ⅝:1. The reaction torque carried by the reaction plate will act in a forward direction and will be about ⅛ of engine torque. The torque carried by the clutch plate 27 will in this case be slightly in excess of engine torque and about 1⅛. It will be observed however that for operation in 3rd, 4th and 5th gears the plate 27 remains engaged. As will be referred to below the reduced torque carried by the clutches results in important advantages as concerns changing from one ratio to another. The increased torque carried in overdrive has no disadvantageous effect owing to the fact that the plate 27 is not brought into engagement during operation in overdrive ratio. Lubricated clutches of this type transmit much greater torque when engaged than during engagement. It will be observed also that the teeth 23 remain engaged with the teeth 24 during operation in 1st, 2nd, 3rd and 4th ratios. The teeth 24 are engaged with the teeth 22 during operation in overdrive ratio. Should the rotary element of the valve 68 now be moved back to 7th position the ports in the element will mate with the same ducts as described above for 4th ratio operation, but the pressure now led to duct 162 will enter the groove 128 and act on the right hand end of the piston 59 thereby maintaining the teeth 24 engaged with the teeth 22. As the gearing associated with the output shaft rotates as a locked unit for 4th or direct drive ratio operation, the torque may be transmitted through the ring gear 16 instead of through the sun gear 18 as described above. This results in a greater torque being transmitted by the clutch plate 27, but this again introduces no disadvantage since the plate 27 remains engaged when changing from overdrive to direct. The use of the duct 162 and the grooves 127, 128 avoids the necessity for disengaging the teeth 24, 22 and engaging the teeth 24, so that the fairly frequent change from overdrive to direct speed and direct overdrive speed with a vehicle operating on the open road does not necessitate movement of the dog clutch 25.

In changing "up" from 2nd to 3rd ratio the pawls 45 are merely moved out of engagement with the teeth 47 and when operating in the 3rd, 4th and 5th ratios the baulk ring 52 moves under the pawls as shown in Figure 2. In changing "down" from 3rd to 2nd the pawls 45 must be engaged with the teeth 47. On movement of the rotary member of the valve 68 to the 5th position the clutch plate 27 is disengaged and if the change is made from 3rd ratio the brake plate 39 is disengaged and the clutch plate 28 engaged, provided the dog clutch 25 is not already in the lefthand position. If the clutch 25 is already to the left, the pressure in the duct 163 will merely tend to hold the piston 59 (and dog clutch 25) to the left. Disengagement of the plate 27 allows the cage member 13 to gradually reduce speed owing to the fact that the plate 27 will not disengage instantly but progressively, this being dependent upon the rate at which the pressure is relieved and the space 35 exhausted of oil. When the member 13 comes to rest and makes slight rotation in the reverse direction due to the engagement of the plate 28, the ring 52 will tend also to move in the reverse direction thus causing the steps 56 to move away from the pawls which thereupon ride on the member 57 and into engagement with the teeth 47. It will be clear that the pawls 45 do not move out of engagement for the selection of any of the other ratios provided.

The teeth 23, 22, 24 are formed with a small helix angle or alternatively these teeth may be straight and the splines 26 formed with a small helix angle. The action will be the same in both cases and for description it will be assumed that the teeth 22, 23, 24 are formed with a 10° left hand helix angle. If now the apparatus is operating in direct ratio with the teeth 24 engaged with the teeth 22 the left hand helix angle will tend to thrust the teeth out of engagement, i. e. the member 25 to the right. Should 3rd ratio now be selected pressure will be relieved from the right hand end of the piston 59 and applied to the left hand end of the piston. The pressure which previously resisted the thrust to the right will now assist and the member 25 will move out of engagement even though the throttle of the engine be maintained wide open thereby maintaining driving load on the teeth 22, 24. If no helix angle were provided the load on the teeth 22, 24 and the splines 26 may prevent the member 25 moving to the right. If the change in ratio is made with the engine throttle shut there will be over-run torque on the teeth 24, 22 and this will tend to thrust the member 25 to the left and thus resist the required movement to the right. For changing to 3rd the clutch plate 27 remains engaged, the clutch plate 28 disengaged and the brake 39 engaged. If teeth 24 engage teeth 22 this results in operation in overdrive. A change to overdrive with the throttle shut will result in momentarily relieving over-run torque from teeth 24, 22, hence the pressure acting on the piston will move the dog clutch 25 to the right. In making the change from direct to overdrive with the teeth 23, 24 engaged pressure will be exhausted from the left hand end of the piston 59 and applied to the right hand end. Thrust from the gears 24, 23 will tend to move the member 25 to the right. If the rotary element of the valve 68 is now moved to the 8th position the plate 27 remains engaged, the plate 28 is disengaged and the plate 39 engaged. With the teeth 23 engaging the teeth 24 this will provide third speed. Even though the throttle be maintained wide open the selection of 3rd speed from direct gear will either momentarily relieve the driving load from the teeth 23, 24 or impart an over-run torque. In either case the member 25 can move to the left and thereby disengage the teeth 23, 24 and engage the teeth 22, 24 which provides an overdrive ratio. It will be observed that if this change is made with the throttle shut there will be over-run torque on the teeth 23, 24 which will be increased momentarily and this will assist the pressure acting on the piston to move the dog clutch to the left.

A further plate brake 210, Figure 9, may be carried by the intermediate shaft 5 and will be constructed in a similar manner to plate brake 39. The arrangement shown in Figure 9 and having an additional brake enables two additional ratios to be obtained, and for certain applications will provide more suitably stepped ratios and increased range. Operation of the apparatus will be similar to that already described except that both a further underdrive and overdrive ratio will be obtained by engagement of plate 27 and the additional reaction brake 210.

A suitable construction of valve 68 is shown in Figures 4 to 7 wherein 190 is a valve housing containing the rotary valve member 191. 192, 292 are pressure channels and 193 are exhausting grooves. The pressure inlet 101 leads to an annular groove 195 which is connected by radial bores 196 to an axial bore 197 which leads to the radial pressure channels 192, 292.

The pressure channels 192 in the rotary valve member 68 mate with the ducts 163, 162, 161, 151 and in the position shown (Fig. 7) pressure is led to duct 163. Duct 162 is closed by the rotary element and ducts 151, 161 open to the exhausting grooves 193. The pressure channels 292 mate with the ducts 72, 105, 177 and in the position shown (Fig. 5) pressure is opened to duct 105, and ducts 72, 177 are opened to exhaust. The rotary element of valve 68 is shown in 1st position. The valve as shown in Figs. 5, 6 and 7 has seven positions only, the lowest ratio reverse being omitted.

As described above the torque carried by the plate brake 39 in 1st ratio is approximately equal to the input torque whilst that carried in 3rd ratio and overdrive is very much less. Similarly the clutch plate 28 carries about half the input torque when operating in 3rd ratio and about a quarter input torque when operating in 4th ratio. The plate 27 carries only about ⅔ of the input torque when engaged for 3rd ratio and about half when operating in 4th ratio. When operating in a high ratio (low gear), for example 1st ratio, it is not normally necessary to transmit the full input torque. A vehicle is frequently started on the level road when only a portion of the maximum torque is required.

When starting a vehicle or changing from one ratio to another any excess torque carried by the clutches or brake will tend to change the speeds of the engine and of the vehicle. When operating in a high ratio the excess torque reaching the road wheels is much greater than when operating in a low ratio owing to the torque multiplication in the transmission. The excess torque is useful for acceleration when starting in or changing to a low ratio but it can be sufficiently excessive when starting in or changing to a high ratio to produce undesirable shock. The reduced loading on the clutches and brakes for decreased ratios provides greatly improved operation. For example, if the torque capacity of the brake 39 is such as to just carry the full torque developed by the engine after rather more than normal slip there will be no shock when starting in 1st ratio or when changing to 1st ratio as there is no additional capacity to handle additional inertial torque from the rotating engine, flywheel and other parts. A certain delay in take up is inherent as the lubricant on the friction faces must be removed before the clutch will carry the full torque. The torque capacity of the brake when changing from 2nd to 3rd ratio will be relatively three times greater (as the brake carries only ⅓ input torque in this ratio) and therefore it will engage without undue delay whilst transmitting additional inertial torque which provides useful acceleration and reasonably rapid reduction of input or engine speed to that required for 3rd ratio operation even though the engine throttle is maintained open. The relatively low torque normally carried by the clutches and brake enables these to be small and cheaply made. The dimensions and weight of the complete apparatus is largely determined by the dimensions of the clutches and brakes.

With clutches designed as shown in the drawings there is considerable engaging pressure developed by the action of centrifugal force on the liquid contained in the rotating oil spaces and in the ducts which lead from the feed grooves. The pressure developed is related to the speed of the rotary clutch housing. In a transmission of this kind in which changes in ratio can be made under power, when making an "up" change i. e., decreasing ratio, the speed of the engine and hence that of the flywheel and other rotating parts is reduced. There is considerable energy stored in these rotating parts and the amount of energy will vary according to the mass and the velocity squared. When changing ratio and reducing the speed of these parts the energy stored prior to making the change will be much greater than that stored on completion of the change and the clutches should transmit the power developed by the engine and also this difference in energy. As the amount of energy is dependent upon the velocity squared there will be more energy to transmit when operating at high speeds than when operating at low speeds; accordingly, the capacity of the clutches should increase with speed, and use of the type of clutches described greatly improves the operation of the device owing to the fact that the torque capacity automatically increases with increase in speed. A reaction brake such as 39 does not correspondingly increase the capacity owing to the absence of centrifugal action and therefore the feature described whereby the capacity of this brake is relatively much greater for decreased ratios when operating speeds are increased is particularly valuable. When changing "down" to higher ratios the action is reversed and in this case it is desirable to utilise clutches and brakes having a slight delay in action whereby if the throttle is maintained fully open the whole of the engine power can be utilised in supplying the additional energy to be stored by the rotating parts.

Another feature of the invention responsible for improved operation particularly as concerns the smooth change of ratio is the arrangement of the one element carrying the clutch plate 28 and the brake plate 39 and the other element carrying the clutch plate 27 and the detent 46, 47. In known apparatus of the kind comprising gearing and a series of clutches and/or brakes arranged to drive or hold certain parts so as to provide a series of driving ratios, it is usual to compound the gearing in such a way that one train will provide a reduction by the engagement of a brake and a direct drive by the engagement of a clutch, and an additional gear train or gear trains may be similarly arranged whereby certain ratios can be provided by the compounding of two or more trains each providing a direct and a reduced ratio. It is necessary in this case to make a change of ratio in each gear train unit simultaneously and this introduces difficulties of control and shock under certain circumstances. For example, four ratios may be provided by two gear train clutch/brake units. For 1st ratio both first and second units operate in indirect. For 2nd ratio the first unit may operate direct and second unit indirect. For 3rd ratio first unit will operate indirect and second unit will operate direct. For 4th ratio both units will operate direct. In making the change from 3rd to 2nd ratio both units are changed simultaneously and if the second unit completes the change in advance of the first unit considerable shock may be introduced owing to a momentary operation in 1st ratio. The automatic operation of such a gear unit presents difficulty and complication avoided by the present invention.

It should be observed that in the case of the present invention the planet cage associated with the output gearing is held stationary for operation in reverse and in at least the highest forward ratio. The loads on the gears and bearings are greater than when operating in the lower driving ratios. In planetary or epicyclic gearing loads on the bearings of the pinions due to centrifugal force are considerable. With the present invention this centrifugal loading occurs only when operating in the lower driving ratios and when the loads due to the transmission of torque are relatively low. It should be observed also that under these conditions the speeds of rotation of the pinions on the bearings are also relatively low.

It will be understood that certain parts of the apparatus described may be omitted, for example the gearing associated with the input clutch. Such an arrangement is shown in Figure 8 in which the intermediate shafts each carry one of the clutch plates 27, 28 and the outer intermediate shaft 5 carries a plate brake 39. This can be smaller than the clutch plates as the reaction torque to be carried will be appreciably less than input torque. The parts are shown with the valve positioned to give highest ratio forward; the second position engages 27, 39, and disengages 28 and 45; 23, 24 remain engaged. The third (direct ratio) position has both clutches 27, 28 engaged, thereby sharing the torque, and 39, 45 are disengaged. 23, 24 are still engaged. The fourth position (overdrive) has 27, 39 engaged, 28, 45 disengaged and 22, 24 engaged. Reverse is obtained by engaging 28, 45, 22, 24. The clutch 27 and brake 39 are disengaged. Such an arrangement thus provides a reverse ratio and four forward ratios, the third ratio being direct and the fourth overdrive. If reverse and overdrive are not required the ring gear and dog clutch may be omitted.

If desired the piston 59 may connect the striker fork 58 or alternatively the striker fork 58 may connect the dog clutch 25 by resilient means so as to produce the "snap action" effect described in my co-pending application Serial No. 609,147, filed August 6, 1945, now abandoned. The pawls may also be arranged in a similar manner, i. e., the fluid may be removed from the space 51 so as to allow the spring 48 to snap the pawls into engagement. This is shown in Figure 10 in which the pawl or detent 45 carries a relatively movable piston head 200 acted on by a separate spring 201 whereby pressure in the space 51 retracts the detent but release of this pressure results in the movement of the piston head 200 by the spring 201 to release the detent which can then engage when synchronised by snap action under the influence of the spring 48.

In Figure 9 a modified arrangement is illustrated in which seven forward ratios are obtainable. In this arrangement the intermediate shaft carries a further plate brake 210 for holding the intermediate shaft 5 stationary.

In the position of the valve for 1st ratio the parts 39, 45, 23, 24 are engaged and 210, 28, 27, 22 are disengaged.

In second 28, 45, 23, 24 are engaged and 27, 39, 210, 22 are disengaged.

In third 27, 210, 23, 24 are engaged and 28, 39, 45, 22 are disengaged.

In fourth 27, 39, 23, 24 are engaged and 28, 210, 45, 22 are disengaged.

In fifth 27, 28, 23, 24 are engaged and 39, 210, 45, 22 are disengaged.

In sixth 27, 39, 22, 24 are engaged and 28, 210, 45, 23 are disengaged.

In seventh 27, 210, 22, 24 are engaged and 28, 39, 45, 23 are disengaged.

The ratios may not, however, be in this order as these will depend on the relative sizes of the various gear wheels.

I claim:

1. Variable-ratio power transmission apparatus comprising an input member, two intermediate shafts, an output shaft, gearing connecting the input shaft with at least one of said intermediate shafts whereby said one intermediate shaft can be driven at a speed different from that of the input member, further gearing adapted to engage said intermediate shafts operatively with the output shaft, two clutches whereby the input shaft can drive each intermediate shaft separately and simultaneously, whereby the output shaft will be driven in one transmission ratio by engagement of the one clutch and in another transmission ratio by the engagement of the other clutch and in still another transmission ratio by engagement of both clutches simultaneously, at least one detent adapted to hold one of the intermediate shafts stationary during drive in at least one transmission ratio, and at least one brake whereby a reaction element providing reaction for one of the said gearings can be held stationary, thereby producing a series of torque speed transmission ratios.

2. Transmission apparatus comprising an input shaft, two intermediate shafts, an output shaft, gearing including two sun wheels, a ring gear and double planetary pinions meshing therewith adapted to connect said intermediate shafts operatively with the output shaft whereby the output shaft can be driven by the intermediate shafts separately in different transmission ratios, and by both the intermediate shafts simultaneously in another ratio, two clutches whereby the input shaft can be connected to the intermediate shafts separately and simultaneously, a detent adapted to hold one of the intermediate shafts stationary during drive in at least one transmission ratio, and a brake adapted to hold part of the gearing stationary during drive in at least one other transmission ratio.

3. Apparatus as claimed in claim 1 wherein one member of said first mentioned gearing is carried by the input shaft whereby part of the torque is transmitted directly to said gearing whereby the torque carried by one or both of said clutches is reduced.

4. Apparatus as claimed in claim 1, wherein the first mentioned gearing comprises two sun-wheels mating with double planetary pinions.

5. Apparatus as claimed in claim 1 wherein the first-mentioned gearing comprises two sun-wheels mating with double planetary pinions, and wherein the gearing connecting the intermediate shafts with the output shaft comprises double planetary pinions mating with two sun-wheels and with a ring gear.

6. Apparatus as claimed in claim 1 wherein the detent includes a baulking or blocker device whereby parts of the detent are prevented from engaging other parts until such time as the parts are substantially stationary, said detent comprising two pawls and a rotatable toothed ring, and the baulking device comprises a ring held in frictional contact with the toothed ring and having steps which co-act with the pawls when said ring is rotating.

7. Apparatus as claimed in claim 1 wherein the gearing connecting the intermediate shafts with the output shaft has at least four elements, means for engaging two of said elements with the output shaft in different transmission ratios, means for connecting two of said elements to the input member, means including a positive detent for engaging one of these two elements with stationary housing of the apparatus, and a baulk or blocker ring carried by the detent whereby parts of the detent are prevented from engagement until such time as the parts are substantially relatively stationary.

8. Apparatus as claimed in claim 1 wherein the gearing connecting the intermediate shafts with the input member has three elements, one consisting of a driving element carried by the input member, another being a reaction element, and the third consisting of a driven element carried by one of the intermediate shafts.

9. Apparatus as claimed in claim 8 wherein the reaction element carries two plates one engageable with a stationary part, the other engageable with the input member.

10. Apparatus as claimed in claim 1 wherein one of the intermediate shafts carries a clutch plate at the one end and a cage member for the gearing associated with the output shaft at the other end whereby the cage for the gearing can be directly connected to the input shaft.

11. Apparatus as claimed in claim 1 wherein one of the intermediate shafts at one end carries one element of the first mentioned gearing and at the other end carries one element of the further gearing.

12. Apparatus as claimed in claim 11 wherein the elements of the gearing carried by the intermediate shaft are sun-wheels.

13. Apparatus as claimed in claim 11 wherein the said intermediate shaft also carries the plate of a plate brake whereby the intermediate shaft can be engaged with a stationary part.

14. Apparatus as claimed in claim 1 wherein the gearing connecting the intermediate shafts with the output shaft has at least four elements, means for engaging two of said elements with the output shaft in different transmission ratios, and wherein the elements are engageable with the output shaft by means of teeth formed with a small helix angle.

15. Apparatus as claimed in claim 1 wherein the gearing connecting the intermediate shafts with the output shaft comprises four elements two of which comprise sun-wheels and one a ring gear engageable with the output shaft by means of teeth having a small helix angle.

16. Transmission apparatus as claimed in claim 1 wherein the detent is arranged for holding the cage of a planetary gearing which cage carries double planetary pinions those of each pair being of different size, the pinions of one size meshing with an outer ring gear and with a sun-wheel carried by one intermediate shaft, and the pinions of the other size are meshed with a second sun-wheel, means being provided for connecting the ring gear and the second sun-wheel to the output shaft during separate driving periods.

HOWARD FREDERICK HOBBS.

REFERENCES CITED

The following references are of record in the file of this patent:

UNITED STATES PATENTS

| Number | Name | Date |
|---|---|---|
| 963,092 | Sundh | July 5, 1910 |
| 1,619,477 | Kurtz | Mar. 1, 1927 |
| 1,636,800 | Blood | July 26, 1927 |
| 2,132,728 | Ford | Oct. 11, 1938 |
| 2,150,950 | Thoma | Mar. 21, 1939 |
| 2,167,873 | Burtnett | Aug. 1, 1939 |
| 2,220,174 | Ravigneaux | Nov. 5, 1940 |
| 2,241,334 | Stucatur | May 5, 1941 |
| 2,282,591 | Orr | May 12, 1942 |
| 2,329,724 | Maurer | Sept. 21, 1943 |
| 2,368,801 | Carnagua | Feb. 6, 1945 |

FOREIGN PATENTS

| Number | Country | Date |
|---|---|---|
| 146,668 | Great Britain | July 15, 1920 |
| 500,311 | Great Britain | Feb. 7, 1939 |
| 502,346 | Great Britain | Mar. 10, 1939 |
| 528,086 | France | Aug. 9, 1921 |